3,422,090
PROCESS OF PRODUCING ESTERS FROM PLANTS OF THE GENUS VALERIANA
Peter Willibrord Thies and Walter Kucaba, Hannover, and Siegfried Funke, Hannover-Kirchrode, Germany, assignors to Kali-Chemie Aktiengesellschaft, Hannover, Germany, a corporation of Germany
No Drawing. Filed Jan. 23, 1964, Ser. No. 339,581
Claims priority, application Germany, Jan. 26, 1963,
K 48,792
U.S. Cl. 260—236.5          13 Claims
Int. Cl. C07g *17/00*

ABSTRACT OF THE DISCLOSURE

The process of obtaining the sedative and spasmolytic esters from roots and rhizomes of plants of the genus Valeriana, which comprises extracting comminuted roots and rhizomes of a plant of the genus Valeriana at a temperature below 30° C. with a lipophilic solvent in the presence of an aliphatic carboxylic acid within a pH range of about 3 to about 7. The purified oil obtained from such a process.

---

The present invention relates to a process of isolating and recovering a therapeutically valuable extract from roots and rhizomes of plants containing same, and more particularly of plants of the genus Valeriana, the principal constituents of said extract being isovaleric acid esters.

It is known, for instance, to isolate and recover a spasmolytically effective ester of isovaleric acid in a yield of less than 0.1% by extracting 125 kg. of roots of the plant *Valeriana officinalis*.

Furthermore, it is known to isolate and recover from *Valeriana wallichii* an ester designated as "substance F" which contains caproic acid in addition to isovaleric acid, in a yield of less than 0.6%. Said known process of isolating the ester "substance F" consists in a very complicated and, therefore, technically impracticable process.

It is one object of the present invention to provide valuable sedative and spasmolytic compositions containing active esters present in plants of the genus Valeriana and being useful in therapy as sedative agents or as spasmolytic agents in the treatment of nervous cardiac disorders, hysteria, neurasthenia, headaches, and, in general, states of excitation and agitation, and the like.

Another object of the present invention is to provide esters from plants of the genus Valeriana which esters are of a surprisingly high degree of purity.

A further object of the present invention is to provide a simple and effective process of producing such therapeutically valuable esters from plants of the genus Valeriana in a high yield.

Other objects of the present invention and advantageous features thereof will become apparent as the description proceeds.

It has been found that therapeutically valuable esters are isolated from roots and rhizomes of plants of the genus Valeriana in a remarkably high yield and of a surprisingly high degree of purity by extracting said plants with lipophilic solvents with the addition of acidic agents at a slightly acid pH-value between about 3.0 and about 7.0 and preferably at about 5.0 and at a temperature below 30° C. Solvents useful in this process are hydrocarbons, halogenated hydrocarbons, ethers, esters, ketones, and alcohols. Suitable acidic agents are carboxylic acids with 2 to 7 carbon atoms, particularly acetic acid, or their acidic derivatives, if necessary, together with their alkali metal salts or their ammonium salts. Extraction may also be effected by means of such acidic agent, i.e. without the addition of lipophilic solvents, preferably in mixture with metal salts thereof which act as buffering agents. The pH-value of the extraction mixture should not be lower than a pH of 3.0; a temperature of 30° C. should not be exceeded. Decomposition of the sensitive esters is apparently avoided by the addition of acidic agents and operating at a slightly acid pH-range.

It has been found that the yield of the valuable esters extracted thereby can be increased up to 2% when extracting German Valeriana plants while a yield up to 3% is obtained in the extraction of Indian Valeriana plants. The extreme sensitivity and the high tendency of the desired isovaleric acid esters to decompose by the action of alkalies, mineral acids, and/or high temperatures is the reason that, heretofore, such esters have not been formed and isolated although they are the main carriers of the therapeutic effectiveness of plants of the genus Valeriana and although such drugs have been used in therapy for centuries.

According to the present invention fresh or dried roots or rhizomes of Valeriana plants are crushed and finely comminuted and then extracted by means of a lipophilic solvent to which, for instance, 1% to 10% of glacial acetic acid has been added. The roots or rhizomes may also be extracted by means of acetic acid alone or, preferably, with the addition of ammonium or alkali metal acetate. Care is taken that the extraction temperature is below 30° C. The resulting extract is freed as far as possible of the extracting solvent by distillation in a vacuum at a temperature below 30° C. The same amount to twice the amount of water is added to the residue and the resulting mixture is exhaustively extracted by a repeated treatment with solvents such as hydrocarbons and/or halogenated hydrocarbons or ethers, i.e. solvents which are difficultly miscible with water. The combined lipid solutions are rendered acid free by a treatment with 2% aqueous sodium hydroxide solution, washed with water, dried over sodium sulfate, and purified by means of activated charcoal. They contain, as main component, isovaleric acid esters which are repeatedly shaken with alcoholic solutions of the acidic agents or with said acidic agents as such. Thereby, they are dissolved by said acidic solvents or acids and are thus separated from non-specific oils and fats. After diluting the combined acid solutions with water, a lipid layer which contains mainly isovaleric acid esters is again obtained.

This extraction process may be repeated several times and the remaining small amounts of isovaleric acid esters present in the aqueous phase can be extracted therefrom by shaking with hydrocarbons, halogenated hydrocarbons, ethers, or other water miscible solvents. The combined solutions containing the isovaleric acid esters are purified by shaking with as little dilute aqueous alkali metal hydroxide solution as possible until free of acid, washed with water, dried over sodium sulfate, and concentrated by evaporation in a vacuum at a temperature below 30° C.

The oily ester fraction obtained according to the present invention contains a number of isovaleric acid esters which can be separated only with difficulty by chromatography. Said ester fraction differs somewhat in its quantitative composition depending upon the starting plant material used.

The following example serves to illustrate the present invention without, however, limiting the same thereto.

Example 1

8 kg. of comminuted roots of Indian Valeriana are converted into a paste by means of a mixture of 14 l. of methanol and 0.14 l. of glacial acetic acid in a percolator. The resulting paste is allowed to stand for 20 hours. Percolation is then started. During percolation, a mixture of methanol and glacial acetic acid (in a ratio of 100:1, by volume,) is continuously added and the percolated liquid is continually concentrated by evaporation at a temperature below 30° C. in a vertical (or climbing) film evaporator.

All in all 32.6 l. of methanol and 0.32 l. of glacial acetic acid are required for percolation which finally yields 4 l. of a concentrated extract. Said extract is mixed with 6 l. of water. The mixture is extracted four times by means of hexane whereby 2 l. of hexane are used each time. The aqueous layer is discarded. The combined hexane layers are freed of acid by a treatment with 2 l. of a 2% aqueous sodium hydroxide solution and are washed with a 5% sodium chloride solution until free of sodium hydroxide. The neutral hexane extract is treated with an equal volume of methanol containing acetic acid whereby no phase separation takes place. Only after addition of 0.3 l. of water a small upper layer is formed which is discarded as it does not contain the desired esters. 10 l. of a 5% sodium chloride solution are added to the lower phase which contains the isovaleric acid esters. Said layer is then extracted three times by means of hexane, each time by means of 2 l. of hexane. The combined hexane extracts (about 15 l.) are purified by means of charcoal, dried over sodium sulfate, and concentrated by evaporation in a vacuum at a temperature below 30° C. 0.195 kg. of a light yellow oil consisting of isovaleric acid esters is obtained thereby.

The milky and turbid aqueous methanol phase remaining after hexane extraction is subjected five times to further extraction with methylene chloride, each time with 2 l. of methylene chloride. The resulting clear, almost colorless, aqueous phase is discarded. The combined methylene chloride extracts are purified by means of charcoal and dried over sodium sulfate. On concentrating the methylene chloride extracts by distillation in a vacuum at a temperature below 30° C., 0.063 kg. of a yellow oil are obtained which also consists of isovaleric acid esters. The total yield is 0.258 kg. corresponding to 3.23% calculated for dry starting material.

Example 2

1 kg. of freshly collected Valeriana roots of Frankonian origin are dried in a drier heated by circulating air at 35° C., comminuted and converted into a paste by means of 2 l. of a mixture of methanol and glacial acetic acid in the proportion of 100:1, by volume, in a percolator. The mixture is allowed to stand for 4 hours. Then percolation is started. Percolation is repeated three more times, each time by using 1 l. of the above mentioned methanol/glacial acetic acid mixture. The percolation time is 18 hours, 24 hours, and 6 hours, respectively.

3.5 l. of the combined percolated extracts are concentrated by evaporation to a volume of ⅓ of the starting volume in a vertical (or climbing) film evaporator at a temperature not exceeding 30° C. The concentrated extract is filtered. 2 l. of a 5% sodium chloride solution are added to the clear filtrate; the resulting mixture is extracted with benzene five times, each time with 0.5 l. of benzine. The combined benzine extracts are deacidified by a treatment with a 2% sodium hydroxide solution, washed with water, dried over sodium sulfate and concentrated by evaporation. The water-alcohol-glacial acetic acid phase is again extracted twice with methylene chloride, each time with 0.5 ml. of methylene chloride, then washed until free of acid, dried, and concentrated by evaporation. Yields: benzene phase 10.3 g.; methylene chloride phase 3.1 g.; total yield: 13.4 g. corresponding to 1.34% of the theoretical yield.

10.3 g. of the resulting yellowish oil containing the esters are dissolved in 0.2 l. of 90% acetic acid. The clear solution is extracted three times with benzine, each time with 0.05 l. of benzine. The combined benzine phases are shaken three times with 95% acetic acid, each time with 0.05 l. The benzine solutions worked up according to known methods contain essentially hydrocarbons, fats, and ethereal oils, while the desired isovaleric acid esters are present in the acetic acid solution. After addition of 0.740 l. of ice water, the acetic acid solution is extracted six times with benzine, each time with 0.40 l. of benzene. The combined benzine extracts are washed until free of acid reaction, dried over sodium sulfate and evaporated to dryness in a vacuum at 20° C.

A light-yellow oil is obtained which consists only of sedative and spasmolytic isovaleric acid esters. Yield of pure compounds: 3.4 g., corresponding to 0.34% of the theoretical yield.

Example 3

100 parts, by volume, of water are added to 10 parts, by volume, of glacial acetic acid. The resulting solution is adjusted to a pH-value of 4.5 by the addition of ammonia. Equal parts, by volume, of acetic acid ethyl ester and ammonium acetate buffer solution are admixed thereto until saturation is achieved.

250 g. of comminuted Valeriana roots of Indian origin are converted into a paste by means of 400 ml. of the above described acetic acid ethyl ester mixture. The resulting paste is allowed to stand for 68½ hours at 22° C. Percolation is then started and continued in such a manner that all of said liquid percolating agent is percolated within 3½ hours. The percolation yields a first percolate of 460 ml., all together, with a pH-value of 3.5 to 4.0. Percolation is repeated with 200 ml. of acetic acid ethyl ester for 18 hours and the residue is washed with 100 ml. of acetic acid ethyl ester.

On repeating percolation for a third time, a percolate is obtained which practically does not contain any esters and, therefore, is discarded.

The combined first and second percolates yield 700 ml., while the total amount of solvent used for percolation is 1100 ml.

Acetic acid ethyl ester is added to the combined percolates to yield 1250 ml. The resulting solution is then shaken three times with a 5% sodium chloride solution saturated with butanol, each time with 650 ml. of said solution. The third extract has still a pH-value of 3.0. Therefore, a 1% sodium bicarbonate solution is added and the extract is again shaken. The water phase has then a pH of 5.0. The acetic acid ethyl ester phase is separated therefrom and dried over magnesium sulfate, filtered, and evaporated to dryness in a rotating evaporator at a bath temperature of 30° C. to 35° C. in a vacuum. The yield of crude extract is 27.289 g., corresponding to 10.9% of the theoretical yield.

The crude extract is dissolved in 270 ml. of 90% acetic acid, subjected to extraction twice with benzine, each time with 75 ml. of benzine, and for two more times, each time with 50 ml. of benzine. The separated benzine phases are discarded. 540 ml. of ice water are added to the acetic acid phase and the solution is subjected to extraction four times with benzine, each time with 200 ml. The ester-containing benzine phase is deacidified by the addition of 200 ml. of a 5% sodium chloride solution saturated with butanol and additionally containing 1% of sodium bicarbonate. Should an emulsion be formed, deemulsification can be effected by the addition of a small amount of sodium chloride.

The ester-containing benzine phases are washed with 200 ml. of water each. The pH-value of the wash-water is 6.0. Magnesium sulfate and decolorizing carbon are added to the ester-containing benzine phase. The mixture is allowed to stand for some time and is filtered. The colorless filtrate is concentrated by evaporation in a vacuum at a temperature not exceeding 30° C. until its weight remains constant. The yield of esters is 7.085 g., corresponding to 2.835% of the theoretical yield, related to the dried starting material.

Example 4

250 g. of comminuted rhizomes of Valeriana plants of Indian origin are repeatedly percolated at 22° C. with n-heptane containing 1% of propionic acid, each time with 500 ml. of said mixture, as described in the preceding examples. The percolation time is 94 hours. The combined extracts amount to 1500 ml. The percolate is washed twice with water saturated with butanol and containing 5% of sodium chloride, each time with 600 ml. By using a sodium chloride solution saturated with butanol, formation of an emulsion is avoided and clear separation of the phases is achieved. The total percolate washed in this manner is dried over magnesium sulfate, filtered, and concentrated by evaporation in a vacuum at a bath temperature of 30° C. until its weight remains constant.

Yield of crude material 11.03 g., corresponding to 4.41%.

11 g. of the crude ester oil are dissolved in 110 ml. of 90% acetic acid and subjected to extraction four times with benzine, saturated with 90% acetic acid, using 30 ml. of said benzine solution for each extraction. The benzine phases are discarded. 270 ml. of ice water are added to the resulting 135 ml. of acetic acid solution and the mixture is subjected to extraction four times with benzine, each time with 100 ml. thereof. The extraction temperature is 10° C. The combined, ester-containing benzine phases are deacidified by washing twice with water, each time with 200 ml. and subsequently with 200 ml. of butanol-saturated water which additionally contains 80 g. of sodium chloride and 4 g. of sodium bicarbonate. The thus purified and deacidified benzine phase is dried over magnesium surfate and decolorized by the addition of 3 g. of charcoal. After filtration, the filtrate is concentrated by evaporation in a vacuum at a bath temperature of 30° C. until its weight remains constant. The liquid yield is 7.521 g. of a colorless ester mixture, corresponding to 3% of the theoretical yield related to the dried starting material.

Example 5

250 g. of comminuted Valeriana roots of Indian origin are percolated with a mixture of acetone, potassium dihydrogen phosphate (Sörensen), and orthophosphoric acid (85%) in a proportion of 475 ml.:25 ml.:0.2 ml. The p-H value of the liquid is 4.55; the temperature is 22° C. The percolation time is 66.5 hours. After one more hour the paste is washed with 500 ml. of the above described solvent mixture and is then again subjected to percolation twice with the above described mixture for 22 hours, using 250 ml. thereof each time. The combined percolates and wash solutions amount to 1030 ml. Said 1030 ml. are concentrated by evaporation in a vacuum at a bath temperature of 35° C. to a volume of 80 ml. About 240 ml. of water are added and the mixture is extracted with three successive 200 ml. portions of acetic acid ester and then with three 100 ml. portions of said ester.

The combined acetic acid ethyl ester extracts of a total volume of 910 ml. are shaken three times with 500 ml. portions of 5% aqueous sodium chloride solution previously saturated with butanol. The third wash water has a pH-value of 5.0.

The thus purified acetic acid ester extract is dried over magnesium sulfate at room temperature of 22–24° C. After filtration the extract is concentrated by evaporation in a vacuum at a bath temperature of 35° C. to constant weight. The yield of the resulting crude material is 28.0 g., corresponding to 11.2% of the theoretical yield.

The crude product is dissolved in 280 ml. of 90% acetic acid (10 times its amount) at a temperature not exceeding 10° C. The solution is subjected to extraction in a separating funnel twice with successive 90 ml. portions of pure benzine, and again twice with 60 ml. portions of benzine. The combined benzine extracts which do not contain therapeutically effective esters are discarded.

Twice the amount of water, i.e. 840 ml., is added to the lower acetic acid layer at a temperature not exceeding 10° C. and the mixture is extracted four times with pure benzine, using 200 ml. of benzine each time. The combined benzine extracts are washed until acid-free, dried over magnesium sulfate, and filtered after addition of 3 g. of de-colorizing carbon. The filtrate is concentrated by evaporation in a vacuum at a temperature not exceeding 30° C. to constant weight. The yield is 7.905 g. of a colorless, oily ester mixture, corresponding to 3.16% of the theoretical yield.

Example 6

250 g. of comminuted Valeriana rhizomes of Indian origin are thoroughly mixed with 50 ml. of a 5% aqueous glycocoll solution and 150 ml. of methanol. 500 ml. of tetrahydrofuran are added thereto in a percolator; the resulting mixture is allowed to stand at a temperature of 22° C. for 70 hours. All the liquid is separated from the rhizomes and the residue is washed with further 300 ml. of tetrahydrofuran. The solvent used for washing and the percolate are combined to yield about 580 ml. of extract. The residue is again percolated with 500 ml. of the above described glycocoll-methanol solution for 22 hours and the residue, after separation of the liquid, is washed with 200 ml. of tetrahydrofuran. 1500 ml. of percolate and wash liquid are concentrated by evaporation in a vacuum at a bath temperature not exceeding 30° C. to a volume of 200 ml. 400 ml. of water are added to the concentrated solution and the resulting mixture is subjected to extraction with six successive 100 ml. portions of benzine. Formation of an emulsion can be avoided by the addition of 40 g. of sodium chloride and a small amount of butanol. The washed extracts are dried over magnesium sulfate, filtered to clarify the same and concentrated by evaporation in a vacuum at a bath temperature of 30° C. to constant weight.

The yield of crude material is 13.7 g., corresponding to 5.48% of the theoretical yield. The impurities are removed from said crude oil by means of 137 ml. of 95% acetic acid and by extracting with benzine using four successive 38 ml. portions thereof. To extract the esters, 354 ml. of ice water are added to the crude oil and the mixture is subjected to extraction with four successive 100 ml. portions of benzine. The yield is 6.865 g., corresponding to 2.74% of the theoretical yield.

Example 7

250 g. of comminuted Valeriana roots of Indian origin are converted into a paste by means of 250 ml. of methylene chloride, to which 2.5 ml. of glacial acetic acid are added. The paste is covered in a percolator with further 150 ml. of methylene chloride containing 1% of glacial acetic acid. The mixture is allowed to stand for 68½ hours at a temperature of 21° C. Percolation is started and continued for 70 hours. During percolation methylene chloride containing 1% of glacial acetic acid is added in portions of 150 ml. each at equal intervals. The total percolate amounts to 800 ml. It is concentrated by evaporation in a vacuum at a bath temperature of 30° C. to a viscous dark-brown extract. Said concentrate is dissolved in 500 ml. of acetic acid ethyl ester and filtered. The acetic acid ethyl ester solution is deacidified by washing it with two successive 250 ml. portions of a 5% sodium chloride solution saturated with butanol and, thereafter, with 250 ml. of 5% sodium chloride solution saturated with butanol and additionally containing 1% sodium carbonate. The pH-value of the last washing solution is 7.0. The acetic acid ethyl ester extract is then washed with two successive 250 ml. portions of a 5% sodium chloride solution, dried over magnesium sulfate, and concentrated by evaporation.

The yield is 18.1 g., corresponding to 7.25% of the theoretical yield.

This crude extract is dissolved in 180 ml. of 90% acetic acid, percolated to a temperature of 10° C., and subjected to extraction with two successive 60 ml. portions of benzine and then with two more successive 36 ml. portions of benzine. The combined benzine layers are shaken with 45 ml. of 90% acetic acid. The acetic acid layers amounting to 250 ml. are combined. Twice the amount of ice water is added thereto and the mixture is subjected to extraction with four successive 200 ml. portions of benzine. The combined benzine extracts are deacidified by washing twice with a 20% sodium chloride solution containing 1% of sodium bicarbonate, using 200 ml. of said solution each time. The washed solution is dried over magnesium sulfate with the addition of decolorizing carbon and concentrated by evaporation to constant weight. The yield is 6.84 g., corresponding to 2.73% of the theoretical yield.

Example 8

100 g. of comminuted Valeriana roots of Indian origin are converted into a paste by means of 200 ml. of propionic acid (pH=5, determined by means of Lyphan pH-paper) in a percolator. The paste is allowed to stand for 70 hours. The percolate is drained off and 150 ml. of propionic acid are again added to the root powder. This operation is repeated four more times. The total percolate amounts to 520 ml. It is mixed with 520 ml. of benzine (boiling point 60° C. to 80° C.). The mixture is allowed to stand at 22° C. for two hours whereby a brown sediment precipitates. The clear benzine/propionic acid solution is removed by decanting, twice the amount, by volume, of ice water is added thereto, and the mixture is extracted by means of benzine. Extraction of the lower propionic acid layer is repeated twice by adding ice water using 500 ml. of ice water each time, extracting the ice water mixture with benzine, using 200 ml. of benzine each time. The combined benzine phases are deacidified by washing as described in the preceding examples and are concentrated by evaporation in a vacuum. The yield is 3.723 g., corresponding to 3.7% of the theoretical yield. This concentrate is worked up to the pure ester mixture according to the preceding examples.

The yield of an almost colorless, oily ester mixture is 1.89% of the theoretical yield.

As stated above, the new isovaleric acid esters recovered and isolated according to the present invention have a noteworthy sedative and spasmolytic activity and thus are of value in therapy.

As stated hereinabove, there may be used, in place of the solvents employed in the preceding examples, other lipophilic solvents, such as aliphatic hydrocarbons, preferably those boiling between 50° C. and 125° C.; aromatic hydrocarbons, preferably those boiling between 80° C. and 200° C.; liquid chloro, bromo, and/or fluoro substituted aliphatic hydrocarbons, preferably those with one to three carbon atoms; aliphatic ethers, preferably those boiling between 35° C. and 100° C.; aliphatic esters, preferably those boiling between 77° C. and 125° C.; aliphatic ketones, preferably those boiling between 56° C. and 125° C.; aliphatic alcohols, preferably those boiling between 65° C. and 150° C. and the like.

In place of carboxylic acids to be added to the lipophilic solvents, there may be used other acidic agents which are soluble therein. It is also possible to use methanol, ethanol, acetic acid ethyl ester, and the like solvents which have been adjusted to a pH-value between about 4.0 and about 5.0, for instance, by means of a suitable acidic phosphate buffer compound or, respectively, composition which is soluble therein. When using alkali metal or ammonium salts of the acidic agents such as the above-mentioned carboxylic acids, solvents are employed in which such salts are soluble.

Extraction with the acidic agents alone, i.e. without solvents, is carried out in the absence of water, i.e. with substantially anhydrous carboxylic acids and the like. No more than about 10% of water should be present in the extracting solvent.

While a preferred method has been disclosed hereinabove, it is understood that many changes and variations as to the starting material used, the extraction procedure, the solvents, acidic agents, and alkali metal and ammonium buffer salts employed, the extraction conditions, temperature, duration, the methods of working up the resulting extracts and of purifying and isolating the desired extraction products therefrom, and the like may be made by those skilled in the art without departing from the spirit and scope of the invention as claimed herein.

We claim:

1. In a process of recovering and isolating sedative and spasmolytic esters from roots and rhizomes of plants of the Indian and Frankonian Valeriana genus, the step which comprises extracting the cominuted roots and rhizomes of plants of the genus Valeriana at a temperature below 30° C. by means of an aliphatic carboxylic acid and at a slightly acid pH-value.

2. The process according to claim 1, wherein the slightly acid pH-value is a pH between about 3.0 and about 7.0.

3. The process of claim 1 in which an alkali metal salt of said acid, acting as buffering agent, is added.

4. The process of claim 1 in which an ammonium salt of said acid, acting as buffering agent, is added.

5. The process according to claim 1, wherein the acidic agent is a carboxylic acid having 2 carbon atoms to 7 carbon atoms.

6. The process according to claim 1, wherein the lipophilic solvent is an organic solvent selected from the group consisting of hydrocarbon, halogenated hydrocarbons, ethers, ketones, and alcohols.

7. The process according to claim 1 wherein the slightly acid pH value is a pH of about 5.0.

8. The process of obtaining the sedative and spasmolytic esters from roots and rhizomes of plants of the genus Valeriana, which comprises extracting comminuted roots and rhidomes of a plant of the Indian and Frankonian Valeriana genus at a temperature below 30° C. with a lipophilic solvent in the presence of an aliphatic carboxylic acid within a pH range of about 3 to about 7.

9. In the process of claim 8 recovering and isolating sedative and spasmolytic esters from roots and rhizomes of plants of the genus Valeriana, the steps which comprise extracting the comminuted roots and rhizomes of a plant of the genus Valeriana at a temperature below 30° C. by means of a lipophilic solvent in the presence of an aliphatic carboxylic acid at a acid pH in the range of about 3 to below 7, removing the acidic agent from the resulting extract, transferring the esters contained in said extract into solution in an alcoholic solution of the acid, adding water to the resulting solution of the esters, and extracting the esters by means of a water immiscible organic solvent, all said steps being carried out at a temperature below 30° C.

10. The process of claim 8 which comprises separating the resulting oil which consists essentially of a mixture of isovaleric acid esters having sedative and spasmolytic activity.

11. The process of claim 8 in which the pH ranges from about 3 to about 5.

12. The process of claim 8 in which the extraction of the esters is carried out on roots and rhizomes of plants of *Valeriana officialis*.

13. In a process of recovering and isolating sedative and spasmolytic esters from roots and rhizomes of plants of the Indian and Frankonian Valeriana, the steps which comprise extracting the comminuted roots and rhizomes of a plant of the genus Valeriana at a temperature below 30° C. by means of a lipophilic solvent with the addition of an aliphatic carboxylic acid at a slightly acid pH-value, removing the acidic agent from said extract, drying the extract, evaporating the same to dryness by distillation in a vacuum at a temperature below 30° C., dissolving the evaporation residue in an alcoholic solution of a carboxylic acid containing 1 to 7 carbon atoms, shaking the acidic solution with a hydrocarbon solvent to remove inactive fats, oils, and hydrocarbon components of said plant material, adding one part to two parts of water to each part of the resulting alcoholic solution of a carboxylic acid, extracting the sedative and spasmolytic esters from said mixture by means of water-immiscible solvents, removing the acidic components of said extract, washing the acid-free extract with water, treating it with decolorizing carbon, drying it, and concentrating the decolorized and dried extract by evaporation at a temperature below 30° C. to yield a slightly yellowish oil.

References Cited

Merck Index, Merck and Co., 6th ed. (1952), p. 992.
Stoll et al., Chem. Abstracts, vol. 51 (1957), col. 15461.
Willaman et al., Economic Botany, vol. 9 (1955), p. 142.

JAMES A. PATTEN, Primary Examiner.

U.S. Cl. X.R.

424—195